J. FOERST.
HYDROCARBON BURNER.
APPLICATION FILED MAR. 6, 1918.
1,279,315.
Patented Sept. 17, 1918.
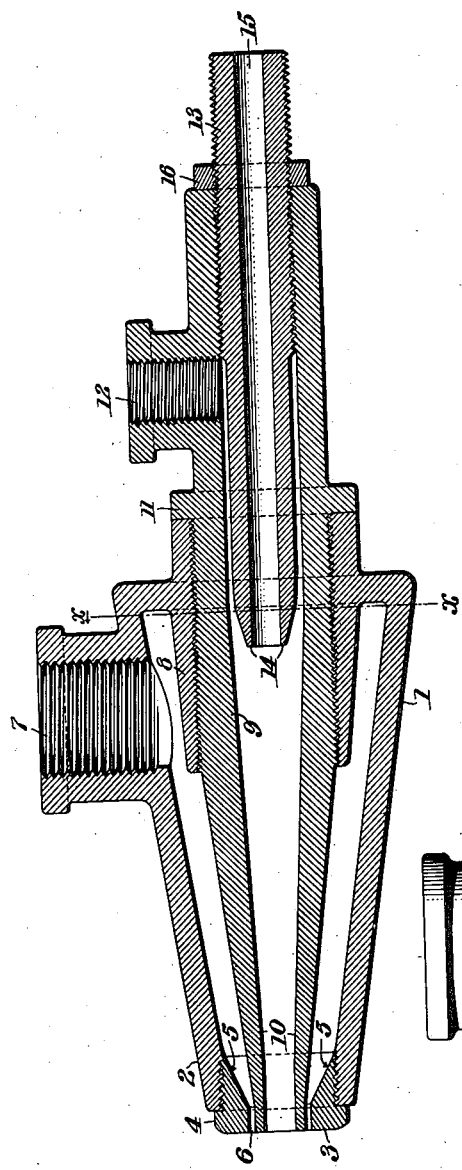
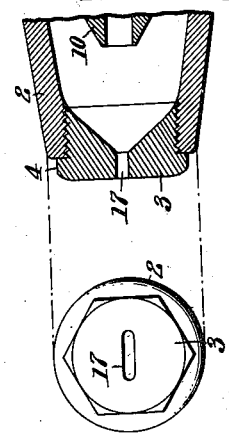
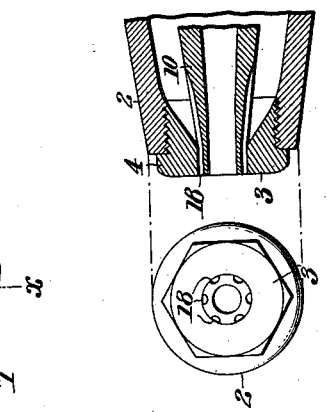
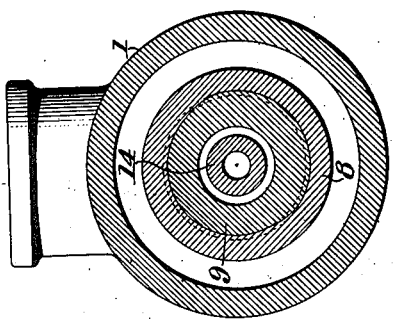
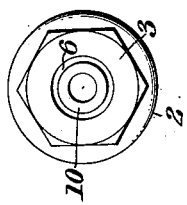
INVENTOR
John Foerst
BY
William B. Stewart
ATTORNEY

UNITED STATES PATENT OFFICE.

JOHN FOERST, OF BAYONNE, NEW JERSEY.

HYDROCARBON-BURNER.

1,279,315. Specification of Letters Patent. Patented Sept. 17, 1918.

Application filed March 6, 1918. Serial No. 220,672.

*To all whom it may concern:*

Be it known that I, JOHN FOERST, a citizen of the United States, residing at Bayonne, in the county of Hudson and State of New Jersey, have invented certain new and useful Improvements in Hydrocarbon-Burners, of which the following is a specification, reference being had therein to the accompanying drawings.

This invention relates to an improvement in hydrocarbon burners and has for an object to provide a simple but efficient burner constructed to guard against leakage and to prevent back-firing in connection with its use with a variety of apparatuses for heating or smelting purposes.

The invention has for a further object to provide the burner with readily replaceable means for controlling the stream issuing therefrom to accord with the type of heating apparatus employed.

Other objects of the invention will be apparent from the following description and claims.

In its preferred embodiment, the present improvement comprises an external injector-barrel, provided with an ingress-port, and terminating at one end in a tapered nozzle, the opposite end thereof being formed into a bearing boss of which one end is directed inwardly within the injector-barrel. Threaded into the bearing boss is a tube projecting within and tapering toward the nozzle end of the injector-barrel. The tube is formed with a flange adapted to fit snugly against the bearing boss and is also provided with an ingress port. Adjacent its outer end the tube is internally threaded to receive a second tube having its tapered mouth projecting toward the nozzle end of the injector, which is internally threaded to receive a stream-controlling bushing having an opening in alinement with the interior of the injector-barrel. The bushing may be readily replaced by another with a different style of opening to correspond with the type of heating apparatus employed.

In the accompanying drawings, Figure 1 is a longitudinal sectional view of the burner. Fig. 2 is a transverse sectional view of the burner on the line *x—x*, Fig. 1. Figs. 3, 4 and 5 are views of modifications illustrative of the bushings which may be applied to the burner and the form of openings which may be employed.

Referring to the drawings, the burner comprises an injector-barrel 1 formed with a tapered nozzle 2 internally threaded for the reception of a bushing 3 provided with a flange 4, which contacts with the end of the nozzle, serving as a stop and to effect a tight joint between the bushing and the nozzle. The inner surface 5 of the bushing merges in a gradual curve into the inner surface of the injector-barrel to provide a smooth surface obviating the gathering of carbon and at its outer end is formed into an opening 6 of a shape requisite to the result desired. The injector-barrel 1 is formed with a laterally projecting interiorly threaded ingress port 7 and with an elongated apertured boss 8 projecting within the barrel to a point slightly beyond the ingress port 7. This construction provides only a narrow opening between the lower edge of the ingress port 7 and the outer surface of the boss, thereby eliminating back-firing even under low pressures of the steam or air employed for producing suction and atomization of the fuel.

Threaded within the apertured boss 8 and supported thereby is a tube 9, tapering at its forward end into a nozzle 10 projecting within the opening in the bushing 3, the position of the tube being determined by a peripheral flange 11 contacting with the rear end of the boss 8. It will be seen that the substantial area of the boss, the threads intermediate it and the tube, and the provision of a flange on the latter to abut the boss at the outer end of the threads, in conjunction, afford a sealed connection between the injector-barrel and the tube, thereby preventing leakage and rendering the use of packing unnecessary.

The tube 9 also is provided with a laterally projecting ingress-port 12 and to the rear of said port is interiorly threaded to receive and support a second tube 13 projecting within the tube 9 a distance commensurate with the result desired and provided with a nozzle 14, of which the outer surface is tapered toward the end of the nozzle. The tube 13 has an ingress opening 15 and is secured in position by means of the lock-nut 16 which contacts with the rearward surface of the tube 9.

In the operation of the device as described, the three ingress-ports may be used for different purposes at different times. For instance, steam or air may be led under pressure through the ingress-port 7, under the influence of which air will be drawn through the port 12 to aerate for combustion purposes, oil discharged through the tube 13. As the mixture passes through the bushing 3 the oil is atomized and ignited in the usual manner. Further, oil may be led through the port 7 and air drawn into the port 12 under the suction of steam or air passed under pressure through the tube 13, etc. The port to be used for a certain purpose is of course determined by the particular effect desired, it being understood that gas may be substituted for the oil as fuel.

For general purposes a bushing having a narrow circular opening as shown in Fig. 1 is desirable. For smelting or the like purposes when it is desired to utilize a flat heavy stream issuing from the injector, it is desirable to use a bushing having an opening 17 as illustrated in the modification shown in Fig. 4 of the drawings. When it is desired to have a fine spray, the nozzle 10 may be formed with peripheral notches as 18, illustrated in the modification shown in Fig. 5 of the drawings and communicating with the interior of the injector-barrel. In the latter construction the inner diameter of the bushing corresponds substantially with the outer diameter of the nozzle 10.

When it is desired to use gas as a fuel for smelting purposes, the bushing is preferably employed, although for regular gas burning, it may be omitted from the modification illustrated in Fig. 4 of the drawings.

Having thus set forth the nature of the invention, what I claim herein is:—

1. In a burner, an injector-barrel formed at one end with a nozzle and at its opposite end with an internally projecting apertured boss formed integral therewith and with an ingress-port overlying said boss, a tube sustained by said boss and formed with a lateral ingress-port and a nozzle projecting within the nozzle of the injector-barrel, and a second tube sustained by and formed with a nozzle projecting within said first mentioned tube.

2. In a burner, an injector-barrel formed at one end with a nozzle and at its opposite end with an internally projecting apertured boss formed integral therewith and with an ingress-port overlying said boss, a tube sustained by said boss and formed with a nozzle projecting within the nozzle of the injector-barrel and extending across said ingress-port, and a second tube sustained by and formed with a nozzle projecting within said first mentioned tube.

3. In a burner, in combination an injector-barrel formed at one end with a nozzle and at its opposite end with an internally-projecting apertured boss, a bushing carried by said nozzle and formed with an opening merging into the inner surface of said nozzle, a tube fitted within said boss and formed with a lateral ingress-port independent of said boss and a nozzle projecting within the opening in said bushing, and a second tube formed with a nozzle projecting within said first-mentioned tube.

4. In a burner, an injector-barrel formed at one end with a nozzle and at its opposite end with an elongated internally-projecting apertured boss and with an ingress-port overlying said boss, a tube fitted within said boss and provided with a nozzle projecting within the nozzle of the injector-barrel, an ingress-port for said tube, a peripheral flange upon said tube in contact with the rear end of said boss, and a second tube sustained by and projecting within said first-mentioned tube.

5. In a burner, in combination an injector-barrel formed at one end with a nozzle and at its opposite end with an internally-projecting apertured boss and with an ingress-port overlying said boss, the inwardly projecting end of said boss terminating beyond said ingress-port, a tube sustained by said boss and provided with a nozzle projecting within the nozzle of said injector-barrel, a lateral ingress-port for said tube independent of said boss, a flanged bushing fitted to said injector-barrel nozzle and spaced from the nozzle of said tube, and a second tube sustained by and projecting within said first-mentioned tube.

In testimony whereof, I have signed my name to this specification.

JOHN FOERST.